United States Patent

Odhner

[15] 3,696,840
[45] Oct. 10, 1972

[54] ADAPTOR FOR ANGULARLY DIVERTING VISCO-ELASTIC MELT FLOW

[72] Inventor: Oliver Randolph Odhner, Westgrove, Pa.

[73] Assignee: Pennwalt Corporation, Philadelphia, Pa.

[22] Filed: Dec. 22, 1970

[21] Appl. No.: 100,638

[52] U.S. Cl. .................................. 138/39, 425/242
[51] Int. Cl. ............................................. F15d 1/04
[58] Field of Search .................... 138/37, 39, 95; 18/12 B, 30 RM, 30 RC, 30 RH, 30 RP, 30 RV; 425/242

[56] References Cited

UNITED STATES PATENTS

| | | | |
|---|---|---|---|
| 889,121 | 5/1908 | Green | 138/37 UX |
| 964,800 | 7/1910 | Luden | 138/37 UX |
| 584,968 | 6/1897 | Taylor | 138/37 UX |
| 2,303,949 | 12/1942 | Nordell | 138/39 |
| 1,576,993 | 3/1926 | Pennington | 138/37 UX |
| 2,227,263 | 12/1940 | Knowles | 18/30 RP |
| 2,358,814 | 9/1944 | Larsen | 138/95 UX |
| 3,470,914 | 10/1969 | Smith | 138/39 |

*Primary Examiner*—H. A. Kilby, Jr.
*Attorney*—Carl A. Hechmer, Jr. and Stanley Bilker

[57] ABSTRACT

An adaptor for diverting the flow direction of a visco-elastic melt stream employs a deflector cover plate which is detachably secured to a block-like body having angularly arranged channels emerging through an inclined surface. The cover plate includes a centrally disposed outwardly projecting shoulder which is received in a complementary recess formed about an imaginary geometric figure circumscribing the emergent channels. An arcuately cupped surface formed in the shoulder has a lip congruent with the imaginary geometric figure.

9 Claims, 9 Drawing Figures

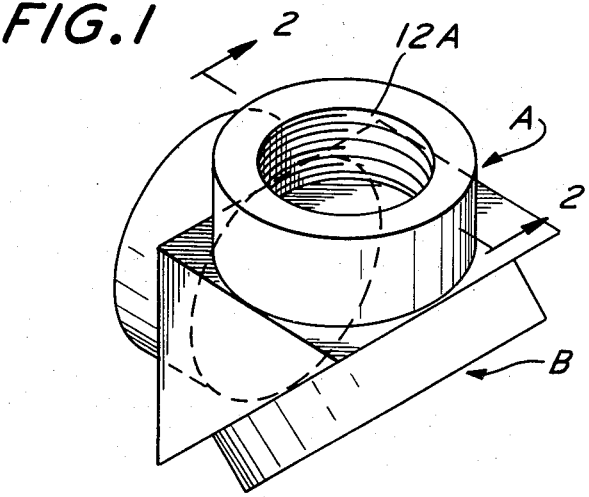
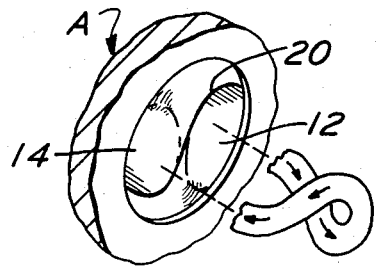
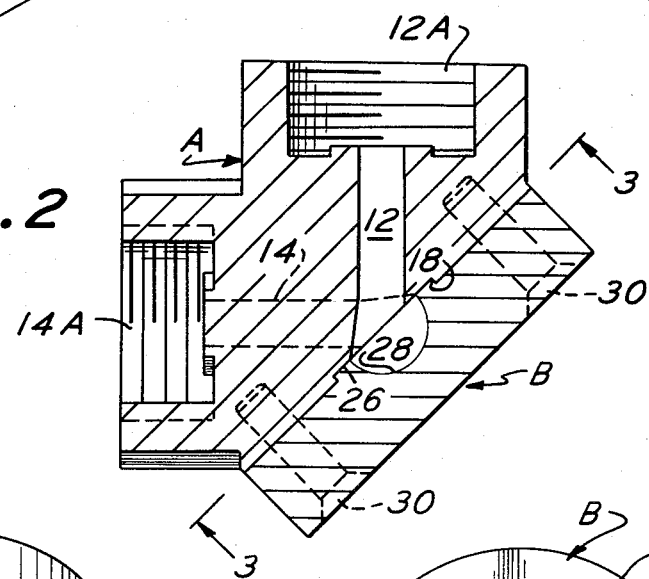
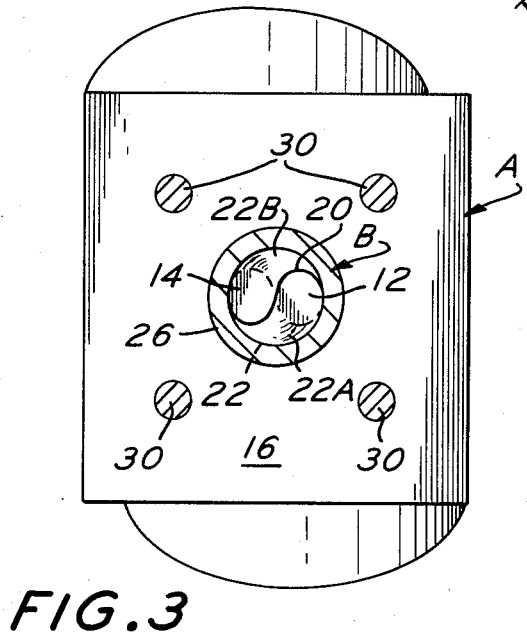
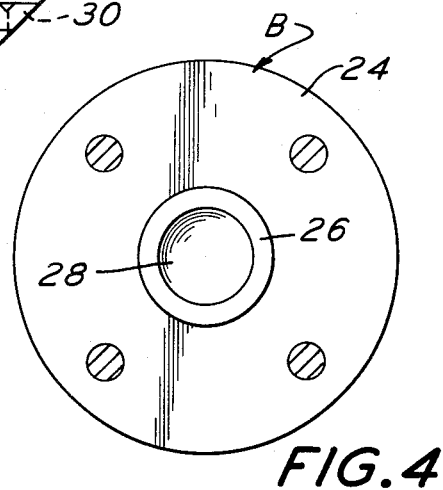
INVENTOR
OLIVER R. ODHNER
BY
*Stanley Bilker*
ATTORNEY

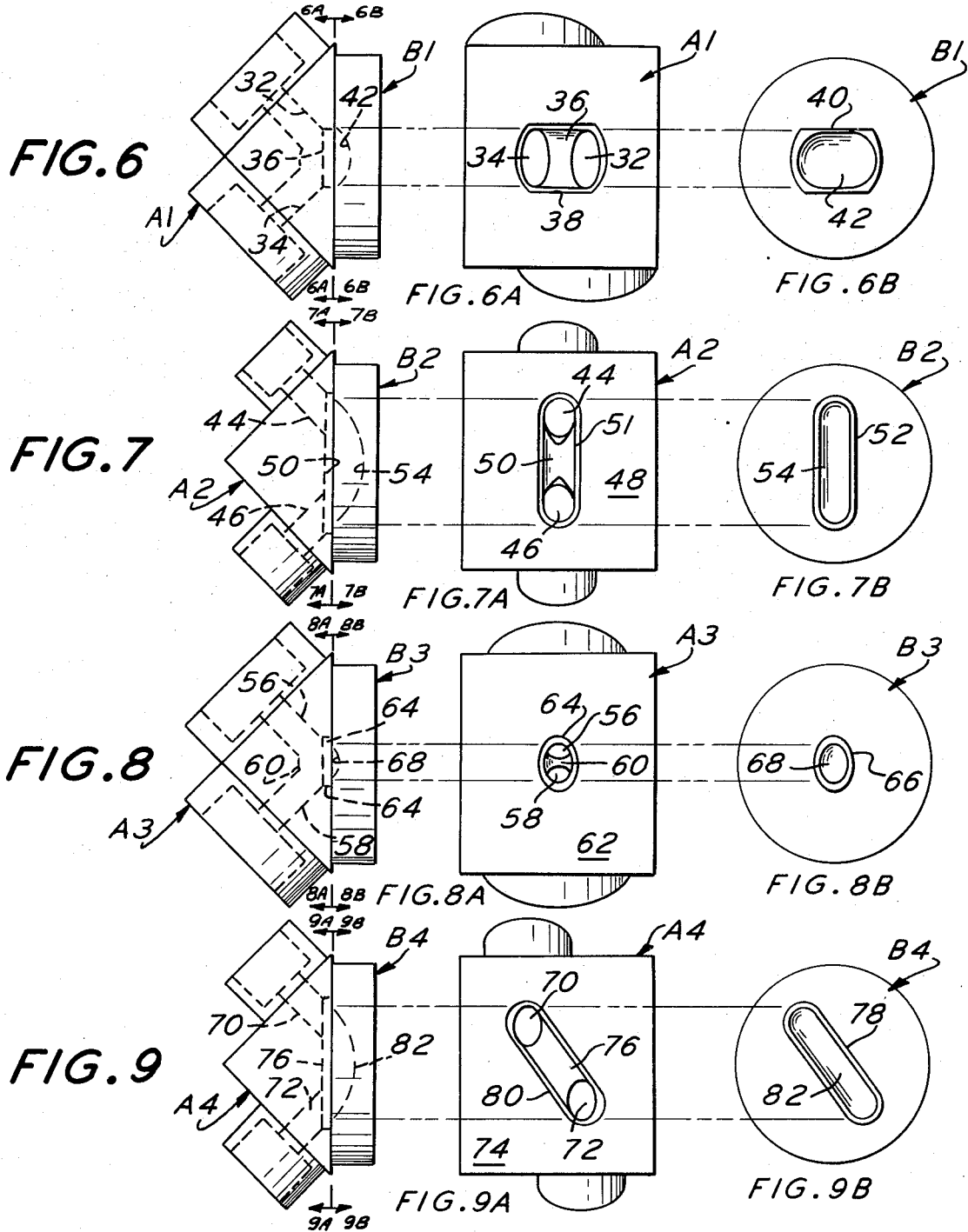

ADAPTOR FOR ANGULARLY DIVERTING VISCO-ELASTIC MELT FLOW

This invention relates to theromoplastic extrusion apparatus and more particularly relates to an adaptor for altering the flow direction of visco-elastic melt streams.

Visco-elastic materials, such as polyvinylidene fluoride, are characterized by very high melt viscosity at processing temperature. These materials are relatively heat sensitive and are easily degraded when exposed to high temperature for any extended period of time. Therefore, in extruding these visco-elastic materials every attempt is made to provide a uniformity of flow through the entire advancing melt stream and to avoid any zones in which drag, hang-up or stagnation may occur.

A conventional system for extruding thermoplastic materials usually comprises an extruder for plasticating and expressing the resin, a die body including a forming die for shaping the material as it is expressed therethrough, and an adaptor for delivering the plasticized melt stream from the extruder to the die body. All of these tandem arranged elements are ordinarily heated to maintain the melt stream at desired uniform temperature compatible with good flow characteristics, the purpose of the adaptor being to direct the flow usually through a right angle.

Whenever the flow of the melt stream changes path direction, different particles of the advancing material travel different distances and different speeds. As a consequence, different portions of the melt stream are subject to different pressures, temperatures and frictional conditions. Since the function of the adaptor is to change the direction of flow, the configuration of its passageways must be such as not to inhibit the melt stream in any manner as would present stagnant areas.

Heretofore, adaptors usually have been constructed in one of the following configurations: One design employed simply a gently curved pipe or duct which carried the melt stream through an arcuate path. However, such a construction was especially difficult to clean because of the problem of scraping out thermally degraded material which had a tendency to build up at the inner radius bend. A second design utilized a split block construction in which complementary arcuate paths were machined out of each half and the blocks bolted together. However, again, the arcuate path was most difficult to clean, and the orientation of the split seam normal to the direction of flow created a predisposition to leakage. A diagonally-through adaptor design, although of one piece construction and having a straight bore, necessarily required special end fittings in order to transform the elliptical projections of its circular bore to circular delivery and discharge passageways. The plug type adaptor utilizing a straight-through bore intersecting with a lateral bore and a cup-faced plug inserted in the former was difficult to machine. Furthermore, the bend was not smooth such that stagnation was created at one zone and turbulence at the opposing zone.

It is therefore an object of this invention to provide an adaptor for diverting the direction of flow of visco-elastic thermoplastic materials without stagnation or hang-up.

Another object of this invention is to provide a visco-elastic flow adaptor which is easily disassembled and readily cleaned.

Yet still another object of this invention is to provide a thermoplastic melt flow adaptor in which the likelihood of leakage is eliminated.

A further object of this invention is to provide a thermoplastic melt stream adaptor in which changes in resin color runs can be easily accomplished.

A still further object of this invention is to provide a visco-elastic melt stream adaptor which is easily machined.

Yet still another object of this invention is to provide a visco-elastic melt stream adaptor of a design which permits various deflector configurations.

Other objects of this invention are to provide an improved device of the character described which is easily and economically produced, sturdy in construction, and highly efficient and effective in operation.

With the above and related objects in view, this invention consists of the details of construction and combination of parts as will be more fully understood from the following detailed description when read in conjunction with the accompanying drawings in which:

FIG. 1 is a perspective view of an adaptor for deflecting the course of flow of visco-elastic plastic melts through angular bends.

FIG. 2 is a sectional view taken along lines 2—2 of FIG. 1.

FIG. 3 is a sectional view taken along lines 3—3 of FIG. 2.

FIG. 4 is a plan view of a cup-shaped deflector cover embodying this invention.

FIG. 5 is a fragmentary perspective view demonstrating the alteration in flow direction produced by this invention.

FIG. 6 is a side sectional view of an adaptor for diverting melt flow from conduits whose axes are at right angles to each other in parallel planes, FIGS. 6A and 6B being respective views along 6A—6A and 6B—6B of FIG. 6.

FIG. 7 is a side elevational view of an adaptor for gradually diverting melt flow through conduits whose axes are oriented at right angles to each other but in a common plane, FIGS. 7A and 7B being respective views along 7A—7A and 7B—7B of FIG. 7.

FIG. 8 is a side elevational view of an adaptor for severely diverting melt flow through conduits whose axes are oriented normal to each other but in a common plane, FIGS. 8A and 8B being respective views along 8A—8A and 8B—8B of FIG. 8.

FIG. 9 is a side elevational view of an adaptor for gradually diverting melt flow through conduits whose axes are oriented normal to each other in parallel planes, FIGS. 9A and 9B being respective views along lines 9A—9A and 9B—9B of FIG. 9.

Referring now in greater detail to the drawings in which similar reference characters refer to similar parts, there is shown a two piece elbow adaptor for diverting plastic melt flow through an angular bend with minimal material hang-up. The adaptor illustrated in FIGS. 1 through 5 comprises a body portion, generally designated as A, and a deflector plate or cover, generally designated as B. The body portion A includes channels 12 and 14 whose axes are oriented at right angles to each other and in adjacently spaced planes. In addition, the channel walls are tangent to each other at their position of intersection with 45° wall 16. Enlarged threaded portions 12A and 14A permit coupling of the adaptor to corresponding threaded portions on ends of conduit (not shown). Flange couplings could also be employed. The embodiment of FIGS. 1 through 5 is termed a "kinked-ell" design because of the flow characteristic exhibited by the melt stream as its path is diverted from channel 12 to channel 14. The "kinked-ell" flow path results from the fact that the axes of the channels 12 and 14 are oriented normal to each other and in parallel planes such that the peripheral walls of the channels at their intersection are tangent. A counterbored recess 18 is undercut in wall 16 outside the imaginary circle which circumscribes the periphery of the channels 12 and 14 at their outboard edges. The zone defined by the S-shaped line portion 20 is maintained as a sharp edge whereas the zone demarked by the imaginary circle 22 is gently relieved to generate complementary tear drop patterns 22A and 22B.

The deflector plate or cover B comprises a flat flanged portion 24 and a shouldered portion 26 of circular configuration which is adapted to interfit within the counterbored recess 18. A concave surface 28, in this case of spherical configuration, is formed within the shouldered portion to define a cup whose major circumferential lip registers with the imaginary circle 22. The cover B is secured to the wall 16 of the body A by means of machine screws 30 threadedly engaging tapped holes in the body. When assembled the shouldered portion 26 interfits within the body recess 18 to define a seal.

As might be expected from the configuration of the deflector cup 28 and the contours of the passages which merge therewith — i.e. the S-shaped sharp edge 20 and the fairing of the area within the imaginary circle 22 — the flow pattern simulates a swirling loop. The melt stream emerging from the channel 12 is curled away from the sharp edge 20 and follows the relieved path of the beveled surface 22 toward the tail of the tear drop 22a. Upon engagement with the deflector cup surface 28, the material flow is reversed and curves about in a complete loop until meeting with the beveled zone 22 (tail of second tear drop 22b) opposite the sharp edge 20 adjacent channel 14. See FIG. 5.

In FIG. 6, there is illustrated another embodiment of this invention in which the body portion A1 has channels 32 and 34 which are oriented in parallel planes but whose peripheries are spaced apart from each other in order to avoid a knife edge at the point of tangency. Accordingly a land portion 36 is defined which facilitates cleaning without danger of burring. The marginal edges surrounding the land 36 and the intersection of the channels 32 and 34 are undercut at 38 to permit reception of shoulder 40 marginally disposed about cupped surface 42 in cover B1. The land portion 36 is also cylindrically relieved to assure contour conformity with the cupped portion 42. In the B1 embodiment, the cupped surface is generally cylindrical in configuration and having spheroidal ends complementary with the outboard wall portions of the channels 32 and 34. While the A1 - B1 adaptor embodiment is related to the "kinked-ell" design, the melt stream does not move through a loop but rather follows a convolute path which includes at least a partial twist.

In FIG. 7, 7A and 7B, there is shown still another embodiment in which body portion A2 includes channels 44 and 46 whose axes lie in the same plane but whose points of intersection with inclined surface 48 are spaced from each other to define a land 50 therebetween. The land portion 50 is cylindrically ground by means of a ball mill and the marginal area of surface 48 bordering the channels 44 and 46 as well as the land 50 is undercut at 51 to receive shoulder 52 of cover B2. The cupped surface 54 is substantially toroidal in configuration and complementary with the outboard edges of the channels 44 and 46 so as to urge the melt stream through a 90° arcuate path without twist or looping.

In FIGS. 8, 8A and 8B, the open-ell intersecting design of embodiment A2 - B2 is altered to form a tight 90° bend in order to minimize plastic inventory within the adaptor. Thus, the body A3 includes channels 56 and 58 whose axes lie in a common plane but whose points of intersection lie inside the body proper. A cylindrical surface 60 is ground into the intersection of the inboard walls of the channels 56 and 58. The marginal area of inclined surface 62 lying about the elliptical opening therein defined by the channels 56 and 58 is undercut to form an elliptical recess 64. The recess 64 receives complementary shoulder 66 in cover B3. An ellipsoidal cupped surface 68 is ground in the shoulder 66 to overlie exactly the emergence of the channels 56 and 58 with the inclined surface 62. As is apparent, the overlapping intersecting design of embodiment A3 - B3 utilizes the minimum adaptor mass with minimum inventory of plastics. While there is no looping or twisting, the radius of the melt stream bend is much tighter than the open-ell design of FIG. 7.

In FIGS. 9, 9A and 9B, there is shown a half kinked design A4 - B4 which combines the kinked arrangement of embodiment A1 - B1 with the open design construction of modification A2 -B2. Channels 70 and 72 have axes which lie in spaced planes and their points of intersection with inclined surface 74 are in space disposition with respect to each other. Land portion 76 lying between the coincidence of the channels 70 and 72 with surface 74 is ground cylindrically to prevent interference with the shoulder 78 of cover B4. The border area surrounding the emerging channels 70 and 72 and the intermediate portion therebetween is undercut at 80 to permit reception of the shoulder 78. The configuration of the concave surface 82 is generally toroidal, and the melt stream is directed in a curvilinear path with a half twist.

As is apparent from the foregoing description, each of the adaptor embodiments permit complete access to both channels for cleaning simply by removing the cover bolts 30 and removing the corresponding deflector plate. Since the shoulder portions of the cover plates always lie outside the profile of the channels at the inclined body surface, there is never a direct imposition of pressure at sealing interfaces. Hence, leakage is minimized since the melt stream does not "see" the abutting faces between the recess and the shoulder head on. By arcuately contouring the cupped surfaces in accordance with the direction of the melt stream path, hang-up of visco-elastic thermoplastic material is virtually eliminated thereby avoiding overheating of the melt at stagnant areas. By elimination of stagnant melt areas, different colored or compound melts can be run consecutively without contamination.

Although this invention has been described in considerable detail, such description in intended as being illustrative rather than limiting since the invention may be variously embodied, and the scope of the invention is to be determined as claimed.

What is claimed is:

1. An adaptor for diverting a visco-elastic melt stream through an angular path comprising: a body portion including a first channel of circular cross section for receiving the melt stream from a plasticizing source, a second channel of circular cross section for delivering the melt stream in a second direction to a die, and a substantially flat surface inclined with respect to said first and second channels and equiangularly disposed to the axes thereof such that said channels emerge through said flat surface; said inclined flat surface having a recessed portion therein marginally disposed about an imaginary closed geometric figure circumscribing both of said channels where they emerge through said flat surface; a cover including a flat flange portion, a centrally disposed outwardly projecting shoulder portion complementary with said recessed portion, and an arcuately cupped deflector surface within said shoulder portion, said arcuately cupped surface having a circumferential lip congruent with the imaginary closed geometric figure defined about said channels and directing the flow of the melt stream in a smooth, arcuate contour; and means for detachably securing said cover upon the inclined flat surface of said body.

2. The adaptor of claim 1 wherein the axes of said channels are oriented at right angles to each other and are in adjacently spaced parallel planes.

3. The adaptor of claim 2 wherein the channels are tangent to each other at their position of intersection with said flat inclined surface.

4. The adaptor of claim 3 wherein the shoulder portion is circular in plan configuration, and the arcuately cupped portion therein is spheroidal.

5. The adaptor of claim 4 wherein the closed imaginary geometric figure is a circle, and S-shaped curved line defined by the tangent between the channel openings maintained as a sharp edge, and the remainder of the zone gently contoured inwardly to define a pair of complementary tear drop projections.

6. The adaptor of claim 2 wherein the axes are spaced apart from each other at their intersection with the inclined flat surface such that the inboard walls of the respective channels are spaced apart from each other to define a land portion therebetween, and the cupped deflector surface is cylindrical in configuration.

7. The adaptor of claim 1 wherein said axes are in a common plane and the inboard walls of the respective channels are spaced apart from each other at their intersection with the inclined flat surface to define a land portion therebetween, and the cupped deflector surface is toroidal in configuration.

8. The adaptor of claim 1 wherein said axes are in a common plane and the zones of emergence of the channels through said inclined flat surface overlap each other, and the cupped deflector surface is ellipsoidal in configuration.

9. The adaptor of claim 1 wherein said axes are in spaced apart planes at their intersection with the inclined flat surface and the inboard walls of the respective channels are spaced apart from each other along a skew line in said inclined surface to define an oblique land portion therebetween, and said cupped deflector surface is toroidal in configuration.

* * * * *